United States Patent
Tiedemann, Jr. et al.

(10) Patent No.: US 7,391,753 B2
(45) Date of Patent: *Jun. 24, 2008

(54) METHOD FOR HANDOFF BETWEEN AN ASYNCHRONOUS CDMA BASE STATION AND A SYNCHRONOUS CDMA BASE STATION

(75) Inventors: Edward G. Tiedemann, Jr., San Diego, CA (US); Daisuke Terasawa, San Diego, CA (US); Sandip Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

This patent is subject to a terminal disclaimer.

(21) Appl. No.: 10/682,046

(22) Filed: Oct. 8, 2003

(65) Prior Publication Data

US 2004/0085938 A1 May 6, 2004

Related U.S. Application Data

(63) Continuation of application No. 09/515,041, filed on Feb. 25, 2000, now Pat. No. 6,724,739.

(60) Provisional application No. 60/121,611, filed on Feb. 25, 1999.

(51) Int. Cl.
*H04Q 7/00* (2006.01)
*H04Q 7/20* (2006.01)
*H04B 7/216* (2006.01)

(52) U.S. Cl. .................... 370/331; 370/342; 455/436

(58) Field of Classification Search ................ 370/331, 370/335, 342, 333, 328, 311, 332, 318, 252; 375/145, 141, 130, 148, 316, 224; 455/436–439, 455/440, 443, 574, 9, 522; 342/457; 714/775
See application file for complete search history.

(56) References Cited

U.S. PATENT DOCUMENTS

| | | | | |
|---|---|---|---|---|
| 6,016,312 A * | 1/2000 | Storm et al. | ................ | 370/311 |
| 6,173,006 B1 * | 1/2001 | Kent et al. | ................... | 375/145 |
| 6,236,365 B1 * | 5/2001 | LeBlanc et al. | ............. | 342/457 |
| 6,553,230 B1 * | 4/2003 | Plestid et al. | ............... | 455/436 |
| 6,567,391 B1 * | 5/2003 | Moon | ......................... | 370/342 |
| 6,665,288 B1 * | 12/2003 | Ottosson et al. | ............. | 370/342 |
| 6,724,739 B1 * | 4/2004 | Tiedemann et al. | ......... | 370/331 |
| 2002/0086720 A1 * | 7/2002 | Kim | ........................... | 455/574 |

* cited by examiner

*Primary Examiner*—Wing Chan
*Assistant Examiner*—Prenell Jones
(74) *Attorney, Agent, or Firm*—George J. Oehling; François A. Pelaez; Thomas R. Rouse

(57) ABSTRACT

An improved method for facilitating handoff between an asynchronous and a synchronous base station. A method for determining a pilot channel PN offset of a pilot channel transmitted by a wireless base station. In a first embodiment, the method includes correlating a PN sequence with a received pilot signal to acquire a PN frame timing, receiving at least one search code burst aligned with the PN frame timing, the at least one search code burst signifying the pilot channel PN offset, and comparing the at least one search code burst to a set of codewords, each codeword representing a predetermined PN offset. From the search code bursts, the mobile station is able to quickly determine the PN offset of the transmitting base station, and thereby identify it. Methods for transmitting a complementary set of forward link channels are also disclosed.

42 Claims, 10 Drawing Sheets

METHOD FOR HANDOFF BETWEEN AN ASYNCHRONOUS CDMA BASE STATION AND A SYNCHRONOUS CDMA BASE STATION

CLAIM OF PRIORITY UNDER 35 U.S.C. §120

The present Application for Patent is a Continuation and claims priority to patent application Ser. No. 09/515,041 entitled "Method and Handoff Between an Asynchronous CDMA Base Station and a Synchronous CDMA Base Station," filed Feb. 25, 2000, now U.S. Pat. No. 6,724,739, and assigned to the assignee hereof and hereby expressly incorporated by reference herein.

This application claims the benefit of U.S. Provisional Application No. 60/121,611, entitled "Asynchronous Operation", filed Feb. 25, 1999.

BACKGROUND OF THE INVENTION

I. Field of the Invention

The present invention relates to wireless communication systems. More particularly, the present invention relates to a novel and improved method for enabling a mobile station to execute a handoff between an asynchronous base station and a synchronous base station in a CDMA wireless communication system.

II. Description of the Related Art

FIG. 1 is an exemplifying embodiment of a terrestrial wireless communication system 10. FIG. 1 shows the three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows a portable computer remote unit 12B and the fixed location remote unit 12C such as might be found in a wireless local loop or meter reading system. In the most general embodiment, remote units may be any type of communication unit. For example, the remote units can be handheld personal communication system units, portable data units such as personal data assistants, or fixed location data units such as meter reading equipment. FIG. 1 shows a forward link signal 18 from the base stations 14 to the remote units 12 and a reverse link signal 20 from the remote units 12 to the base stations 14.

An industry standard for a wireless system using code division multiple access (CDMA) is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here in as IS-95), the contents of which are also incorporated herein by reference. More information concerning a code division multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated in its entirety herein by this reference.

Third-generation CDMA wireless communications systems have also been proposed. The cdma2000 ITU-R Radio Transmission Technology (RTT) Candidate Submission proposal forwarded by the Telecommunications Industry Association (TIA) to the International Telecommunication Union (ITU) for consideration for the IMT-2000 CDMA standard is an example of such a third-generation wireless communication system. The standard for cdma2000 is given in draft versions of IS-2000 being generated by TR45 of the TIA. The cdma2000 proposal is compatible with IS-95 systems in many ways. For example, in both the cdma2000 and IS-95 systems, each base station time-synchronizes its operation with other base stations in the system. Typically, the base stations synchronize operation to a universal time reference such as Global Positioning Satellites (GPS) signaling; however, other mechanisms can be used. Based upon the synchronizing time reference, each base station in a given geographical area is assigned a sequence offset of a common pseudo noise (PN) pilot sequence. For example, according to IS-95, a PN sequence having $2^{15}$ chips and repeating every 26.66 milliseconds (ms) is transmitted by each base station in the system at one of 512 PN sequence offsets as a pilot signal. The base stations continually transmit the pilot signal which can be used by the remote units to identify the base stations as well as for other functions.

Base station time-synchronization as provided in the cdma2000 and IS-95 systems has many advantages with respect to system acquisition and handoff completion time. Synchronized base stations and time-shifted common pilot signals as discussed above permit a fast one-step correlation for system acquisition and detection of neighboring base stations. Once the mobile station has acquired one base station, it can determine system time which is the same for all neighboring synchronous base stations. In this case, there is no need to adjust the timing of each individual mobile station during a handoff between synchronous base stations. Additionally, the mobile station does not need to decode any signal from the new base station in order to obtain rough timing information prior to handing off.

Another recently-proposed 3G communication system is referred to as W-CDMA. One example of a W-CDMA system is described in the ETSI Terrestrial Radio Access (UTRA) International Telecommunications Union (ITU) Radio Transmission Technology (RTT) Candidate Submission forwarded by ETSI to the ITU for consideration for the IMT-2000 CDMA standard. The base stations in a W-CDMA system operate asynchronously. That is, the W-CDMA base stations do not all share a common universal time reference. Different base stations are not time-aligned. As a result, W-CDMA base stations employ a 3-step acquisition procedure with multiple parallel correlations in each step. In the W-CDMA system, each base station transmits a "synchronization" channel that comprises two sub-channels. The first of the two sub-channels, the primary synchronization channel, uses a primary synchronization code, $c_p$, that is common to all base stations. The second of the two sub-channels, the secondary synchronization channel, uses a cyclic set of secondary synchronization codes, $c_s$, that are not shared by other base stations that are not in the same code group. The mobile station in a W-CDMA system can acquire the synchronization channel of one or more base stations by searching for the primary synchronization code, $c_p$, of the primary synchronization channel, and then using the timing information derived from the primary synchronization channel to process the secondary synchronization channel.

Recently, a combined CDMA IMT-2000 standard has been proposed in which cdma2000-compliant equipment and W-CDMA-compliant equipment may be optionally supported by any manufacturer. Thus, it is expected that synchronous base stations of a cdma2000-compliant system will be geographically located near asynchronous base stations of a W-CDMA-compliant system. This creates a need to be able to handoff a mobile station that supports both cdma2000 and W-CDMA operation between the asynchronous base stations of a W-CDMA system and the synchronous base stations of a cdma2000 system, and vice versa.

U.S. Pat. No. 5,267,261 entitled "MOBILE STATION ASSISTED SOFT HANDOFF IN A CDMA CELLULAR COMMUNICATIONS SYSTEM," which is assigned to the assignee of the present invention and which is incorporated herein, discloses a method and system for providing communication with the remote unit through more than one base station during the handoff process. Further information concerning handoff is disclosed in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", U.S. Pat. No. 5,640,414, entitled "MOBILE STATION ASSISTED SOFT HANDOFF IN A CDMA CELLULAR COMMUNICATIONS SYSTEM", and U.S. Pat. No. 5,625,876 entitled "METHOD AND APPARATUS FOR PERFORMING HANDOFF BETWEEN SECTORS OF A COMMON BASE STATION," each of which is assigned to the assignee of the present invention and incorporated in its entirety herein by this reference. The subject matter of U.S. Pat. No. 5,625,876 concerns so-called "softer handoff." For the purposes of this document, the term "soft handoff" is intended to include both "soft handoff" and "softer handoff." U.S. Pat. No. 6,456,606, entitled "HANDOFF CONTROL IN AN ASYNCHRONOUS CDMA SYSTEM", assigned to the assignee of the present invention and incorporated in its entirety herein by reference, also provides additional information on handoff procedures involving both synchronous and asynchronous base stations.

Each base station is associated with a set of neighboring base stations surrounding the base station. Due to the physical proximity of the coverage areas of the neighboring base stations to the coverage area of the active base station, the remote units which are communicating with the active base station are more likely to handoff to one of the neighboring base stations than to other base stations in the system. In the IS-95 and cdma2000 systems, the base station identifies the neighboring base stations to the remote units with which it has established communication using a neighbor list identification message. The neighbor list identification message identifies a neighboring base station according to the PN sequence offset at which it transmits the pilot signal. In the IS-95 and cdma2000 systems, there is a one-to-one correspondence in a given geographical area between a base station and a PN sequence offset. In other words, two base stations operating in the same geographical area do not both use the same PN sequence offset. Thus, a base station in the IS-95 or cdma2000 system can be uniquely identified in a geographical region by its PN sequence offset.

The remote unit uses the neighbor list to limit the space over which it searches for handoff candidates. Because the searching process is so resource intensive, it is advantageous to avoid performing a search over the entire set of possible PN sequence offsets. By using the neighbor list, the remote unit can concentrate its resources on those PN sequence offsets which are most likely to correspond to useful signal paths.

A typical IS-95 or cdma2000 neighbor acquisition operation is practical so long as each base station's timing remains synchronous with respect to the others. However, in some systems such as W-CDMA, advantages are achieved by decoupling operation of the system from a synchronizing reference. For example, in a system which is deployed underground, such as in a subway system, it can be difficult to receive a universal time synchronization signal using GPS. Even where strong GPS signals are available, it is perceived as desirable in some political climates to decouple system operation from the U.S. Government GPS system. There may be other reasons for decoupling operation of the system from a synchronizing reference.

In a system where one or more of the base stations operate asynchronously with respect to other base stations in the system, the base stations cannot be readily distinguished from one another based merely upon a relative time offset (typically measured as a relative PN sequence offset) because a relative time offset between the base stations cannot be established without the use of a common time reference. Thus, when a remote unit is in communication with an asynchronous base station, and has not been recently in communication with a synchronous base station, the remote unit is unlikely to have system time information of the synchronous base stations to a sufficient accuracy.

For example, suppose a remote unit has been in the coverage area of an asynchronous base station and is moving into the coverage area of a synchronous base station. Further suppose that the remote unit is able to detect the pilot signals of two different synchronous base stations by determining their relative PN sequence offsets. Unless the remote unit already knows system time of the synchronous base stations to a sufficient accuracy, the remote unit will be unable to determine which pilot signal is being transmitted by which base station. In other words, although the remote unit is able to distinguish that there are two different synchronous base stations due to their different relative PN sequence offsets, the remote unit is unable to determine the identity of either synchronous base station based on their pilot signals alone because the remote station does not have an absolute time reference with which to compare the two PN sequence offsets.

In a conventional IS-95 or cdma2000 system, once the forward pilot channel is acquired, the remote unit can then demodulate the forward Sync channel. This is possible because the forward sync channel timing is such that its frame boundary is always aligned to the beginning of the PN sequence of the forward pilot channel. In other words, the forward sync channel frame boundary is always offset from system time by the same number of PN chips as the PN sequence offset of the corresponding forward pilot channel. The forward sync channel carries a sync channel message which includes overhead information such as system identification, system time, the base station's PN sequence offset, and several other items of useful information. After demodulating the sync channel message, the remote unit adjusts its internal timing according to the PN offset and system time sent in the sync channel message as described in IS-95.

Because the conventional sync channel is transmitted at a low data rate (for example, 1200 bps in IS-95), and the sync channel message contains a large amount of overhead information that must be demodulated on a frame-by-frame basis, it may be on the order of 800 milliseconds before the remote unit is able to determine the system identity of the transmitting base station via the sync channel message. This delay can undesirably affect the timing of a handoff from the asynchronous base station to the synchronous base station, particularly in a fading environment. In some instances, the delay associated with the remote unit having to determine the system identification of the target synchronous base station(s) by demodulating a conventional sync channel message would be unacceptably long, causing degradation or even dropping of a call in progress.

Thus, there is a need for an improved method for facilitating handoff between asynchronous and synchronous base stations that avoids the undesirable delays associated with demodulating a conventional sync channel message.

SUMMARY OF THE INVENTION

The present invention provides improved methods for facilitating handoff between an asynchronous and a synchronous base station. Several exemplary embodiments are disclosed. It will be understood that upon reading this description a person of ordinary skill in the art will understand how to make and use the invention described herein without limitation to the specific examples described.

The present invention provides a method for determining a pilot channel PN offset of a pilot channel transmitted by a wireless base station. It is anticipated that this method would be employed by a wireless receiver such as a mobile station. In a first embodiment, the method includes correlating a PN sequence with a received pilot signal to acquire a PN frame timing, receiving at least one search code burst aligned with the PN frame timing, the at least one search code burst signifying the pilot channel PN offset, and comparing the at least one search code burst to a set of codewords, each codeword representing a predetermined PN offset. From the search code bursts, the mobile station is able to quickly determine the PN offset of the transmitting base station, and thereby identify it.

The at least one search code burst may comprise a plurality of search code bursts repeated a predetermined number of times per PN frame. In such a case, the plurality of search code bursts signify the pilot channel PN offset and phase. Alternately, the at least one search code burst may comprise a single search code burst repeated a predetermined number of times per PN frame. In such a case, the single search code burst signifies the pilot channel PN offset and phase. Each of the single search code bursts may be comprised of a predetermined number of fixed chip patterns or their complement.

In a second embodiment, the method includes searching for a primary search code to acquire a search code slot timing, the primary search code aligned with a system time frame, correlating a PN sequence with a received pilot signal to acquire a PN frame timing using the search code slot timing, searching for at least one secondary search code burst aligned with the PN frame timing, the at least one secondary search code burst signifying the pilot channel PN offset, and comparing the at least one secondary search code burst to a set of codewords, each codeword representing a predetermined PN offset. The secondary search code may comprise a plurality of search code bursts repeated a predetermined number of times per PN frame. In such a case, the plurality of search code bursts would encode the pilot channel PN offset and phase.

In a third embodiment, the method includes searching for a primary search code to acquire a search code slot timing, the primary search code aligned with a system time frame, searching for at least one secondary search code burst aligned with the search code slot timing, comparing the at least one secondary search code burst to a set of codewords, each codeword representing a predetermined PN offset group, and correlating a PN sequence with a received pilot signal at a plurality of PN offsets associated with the PN offset group to find the pilot channel PN offset and phase. The at least one secondary search code burst may comprise a plurality of search code bursts repeated a predetermined number of times per system time frame. The method may also include, in the correlating step, correlating the PN sequence at a plurality of PN shifts associated with the predetermined number of repeated search code bursts.

In a fourth embodiment, the method may include correlating a PN sequence with a received pilot signal to acquire a PN frame timing, searching for a primary search code using the PN frame timing to acquire a search code slot timing, the primary search code aligned with a system time frame, determining a PN offset group and system frame timing from a difference between the PN frame timing and the search code slot timing, searching for at least one secondary search code burst aligned with the search code slot timing, and comparing the at least one secondary search code burst to a set of codewords, each codeword representing a predetermined pilot channel PN offset and phase. In this embodiment, the pilot signal, primary search code, and at least one secondary search code burst are each spread using the same PN sequence, and further may each be covered with a different orthogonal Walsh sequence.

The present invention also provides a method for transmitting a set of forward link channels. It is envisioned that this method would be practiced by a wireless transmitter such as a base station, and particularly a synchronous base station, in order to assist a wireless receiver such as a mobile station in acquiring and identifying the transmitter. This transmission method is complementary to the PN offset determination method summarized above. The method generically includes transmitting a pilot channel having a repeating sequence of PN frames, and transmitting at least one search code channel, the at least one search code channel comprising a repeating sequence of bursts, the at least one search code channel for providing a pilot channel PN offset of the pilot channel.

In one embodiment, the at least one search code channel comprises a plurality of search code bursts repeated a predetermined number of times per PN frame, and the plurality of search code bursts signify the pilot channel PN offset and phase. In a second embodiment, the at least one search code channel comprises a single search code burst repeated a predetermined number of times per PN frame, and the single search code burst signifies the pilot channel PN offset and phase. In this second embodiment, each of the single search code bursts may be comprised of a predetermined number of fixed chip patterns or their complement.

In a third embodiment, the at least one search code channel comprises a primary search code channel and a secondary search code channel. The secondary search code channel may comprise a plurality of search code bursts repeated a predetermined number of times per PN frame, the plurality of search code bursts encoding the pilot channel PN offset and phase. Alternately, the secondary search code channel may comprise a plurality of search code bursts repeated a predetermined number of times per system time frame. Additionally, the pilot channel, primary search code channel, and secondary search code channel may each be spread using the same PN sequence and each covered with a different orthogonal Walsh sequence.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
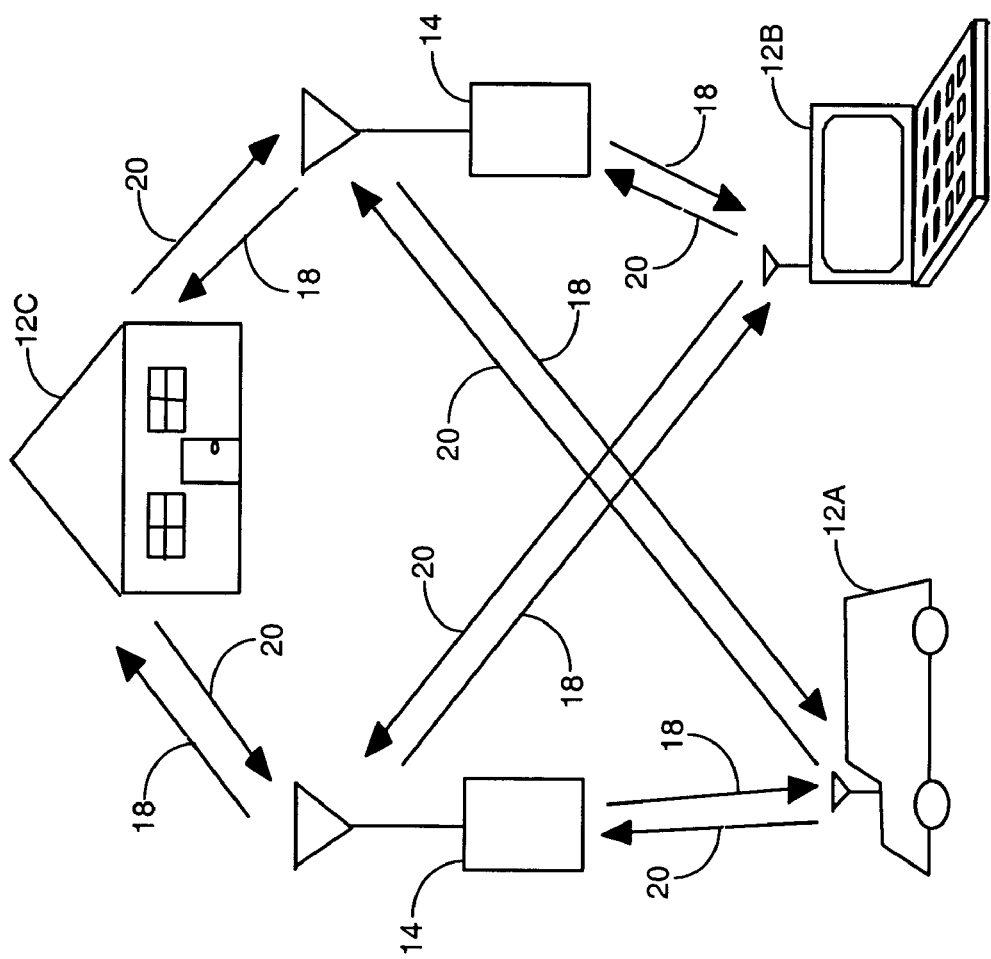
FIG. 1 is an exemplifying embodiment of a terrestrial wireless communication system.
Figure 2:
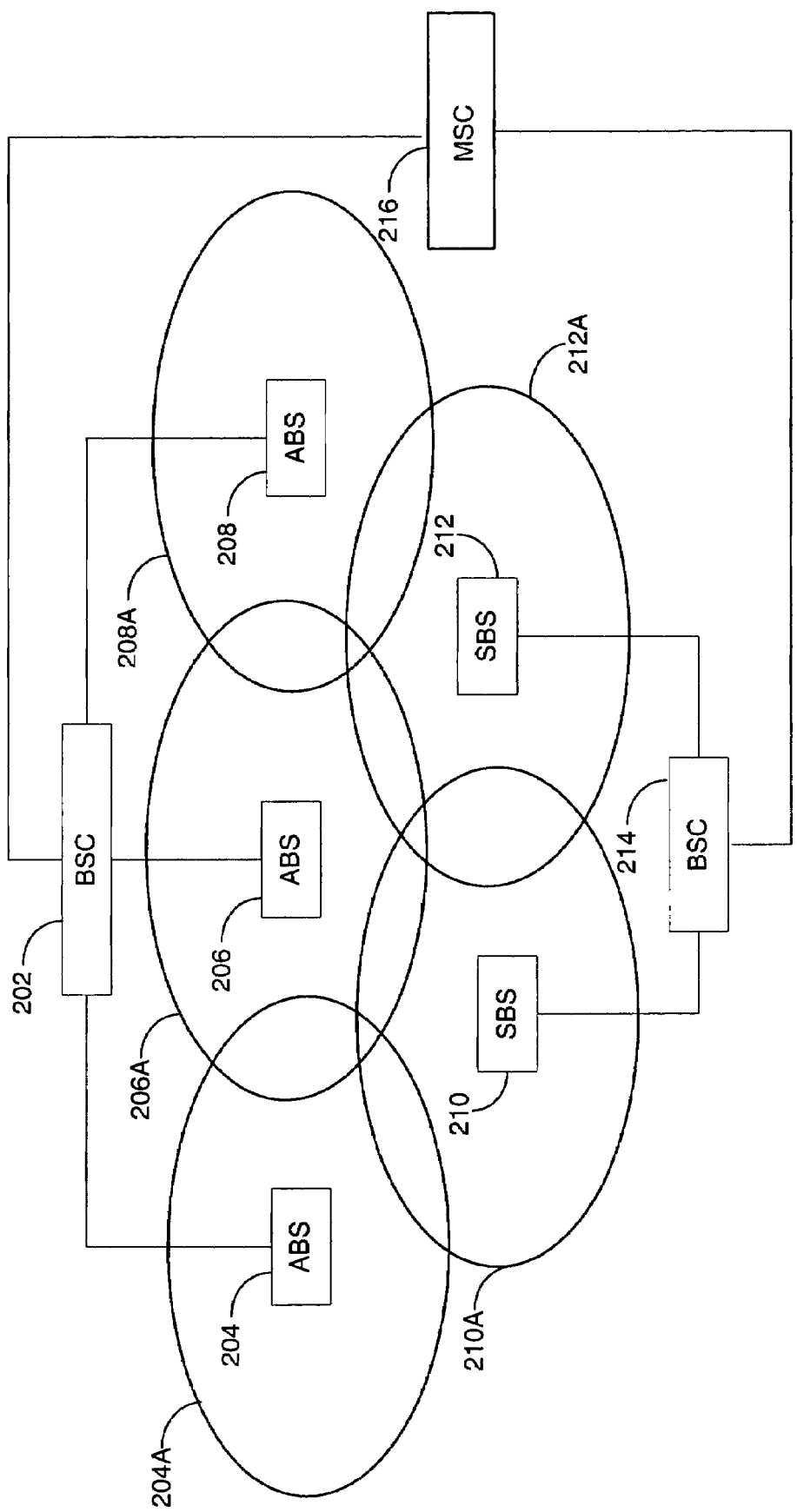
FIG. 2 is a wireless communication system including both synchronous and asynchronous base stations.

Referring now to FIG. 2, an example wireless communication system is illustrated in which both synchronous and asynchronous base stations are illustrated. A Mobile Switching Center (MSC) 216 may be coupled to the Public Switched Telephone Network (PSTN) (not shown). It should be understood that MSC 216 may instead be coupled to a different network other than a PSTN, or may be coupled to a data network. MSC 216 is also coupled to two Base Station Controllers (BSC) 202 and 214. The BSCs 202 and 214 may themselves be coupled to a separate data network or other network (not shown). BSC 202 is illustrated as being coupled to three asynchronous base stations (ABS) 204, 206, and 208, with geographical coverage areas (sometimes referred to as "cells") 204A, 206A, and 208A, respectively. BSC 214 is illustrated as being coupled to two synchronous base stations (SBS) 210 and 212, with geographical coverage areas 210A and 212A, respectively. As can be seen from FIG. 2, there is significant overlap in the geographical coverage areas of the respective asynchronous and synchronous base stations. It is in these overlapping regions that handoff of a remote unit is expected and in which the present invention provides significant advantages. It is understood that there may be more or fewer synchronous base stations and asynchronous base stations than are shown in the example illustration of FIG. 2. Additionally, it is understood that BSC 202 and BSC 214 may not both be connected to the same MSC 216, but rather may be connected to independent MSCs or other network entities that are in turn interconnected by the PSTN (not shown).

Figure 3:
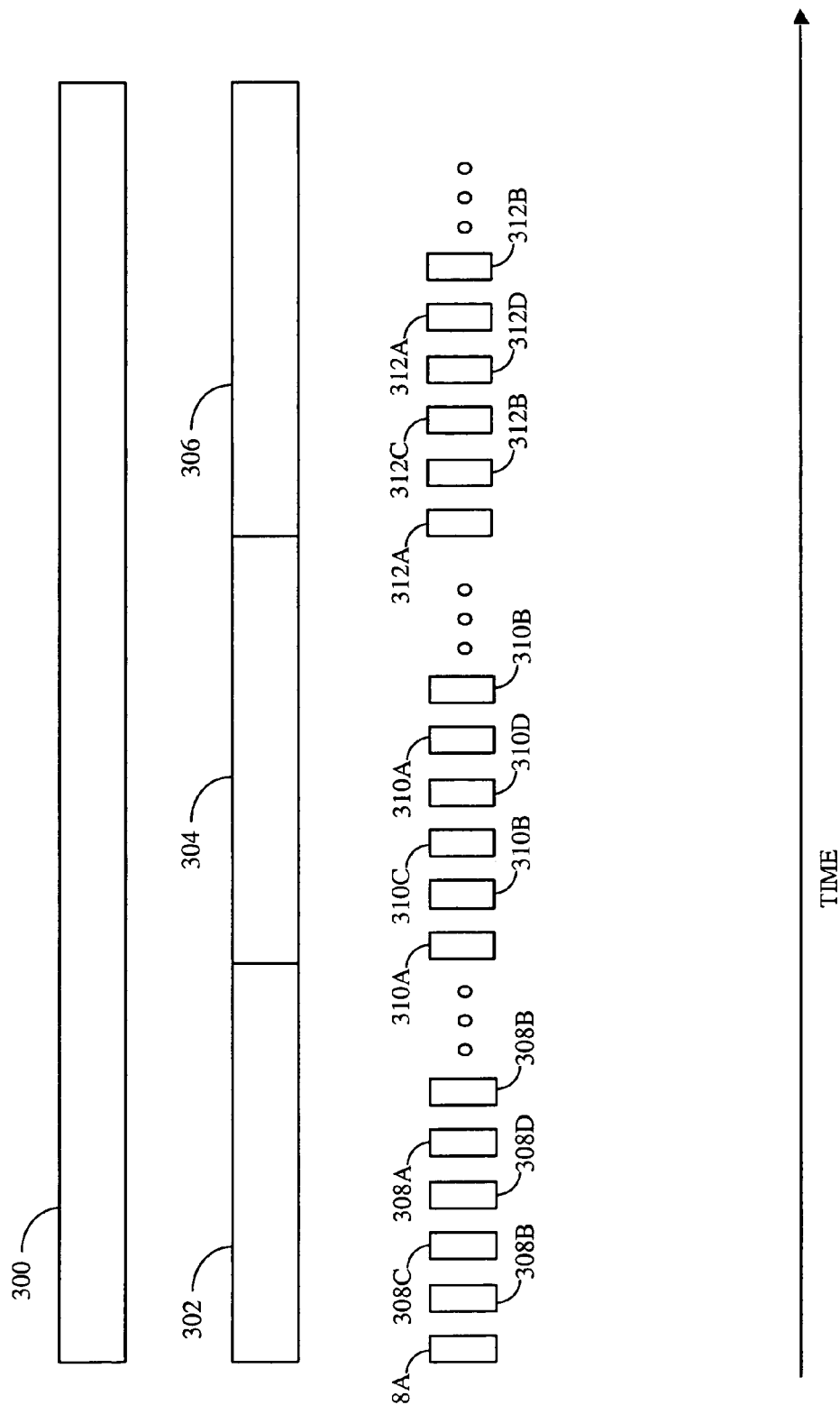
FIG. 3 is a timing diagram of a first embodiment of the present invention.

Various embodiments of the present invention will now be described. The present invention seeks to determine the pilot offset and frame phase within system time. As used herein, the term "phase" refers to frame-level phase. Turning now to FIG. 3, a timing diagram of a first embodiment of the present invention is illustrated. In FIG. 3, an 80 ms sync channel superframe 300, three 26.67 ms pilot channel frames 302, 304, 306, and a sequence 308-312 of search code bursts are illustrated. These channels are transmitted by one or more of the synchronous base stations 210, 212. The sync channel superframe 300 may be a conventional cdma2000 sync channel superframe. The pilot channel frames 302, 304, 306 may be three consecutive frames of a conventional cdma2000 pilot channel. As used herein, the phrase "pilot channel frame" refers to a single PN sequence period. However, it should be noted at the outset that the numerology used in the Figures is merely exemplary and is used for teaching the present invention. The present invention is not intended to be limited to the numerology shown.

In the embodiment shown in FIG. 3, the search code bursts are shown as a repeating sequence of four bursts of 256 chips each, with 833 microsecond periodicity. As a result, there are 32 bursts during, and aligned with, each pilot channel frame 302, 304, 306. Thus, each sequence of four bursts of 256 chips each is repeated eight times during a single pilot channel frame 302, 304, or 306. Each one of the bursts are selected from one of sixteen possible orthogonal codes. Thus, the sequence 308A-308D is one of 164 possible four-burst sequences, and the sequence 310A-310D is a different one of the 164 possible four-burst sequences. Each four-burst pattern represents a combination of one of 512 possible PN offsets, and 3 possible PN frame phases within the sync channel superframe 300. So in summary, sixteen search codes are used. The pattern over four bursts (⅛ of a pilot frame 302, 304, or 306) provides 164 possible patterns, 1536 of which are used to represent a given PN offset and 80 ms phase. The four-burst pattern is repeated eight times over the duration of a single pilot frame 302, 304, or 306.

Figure 4:
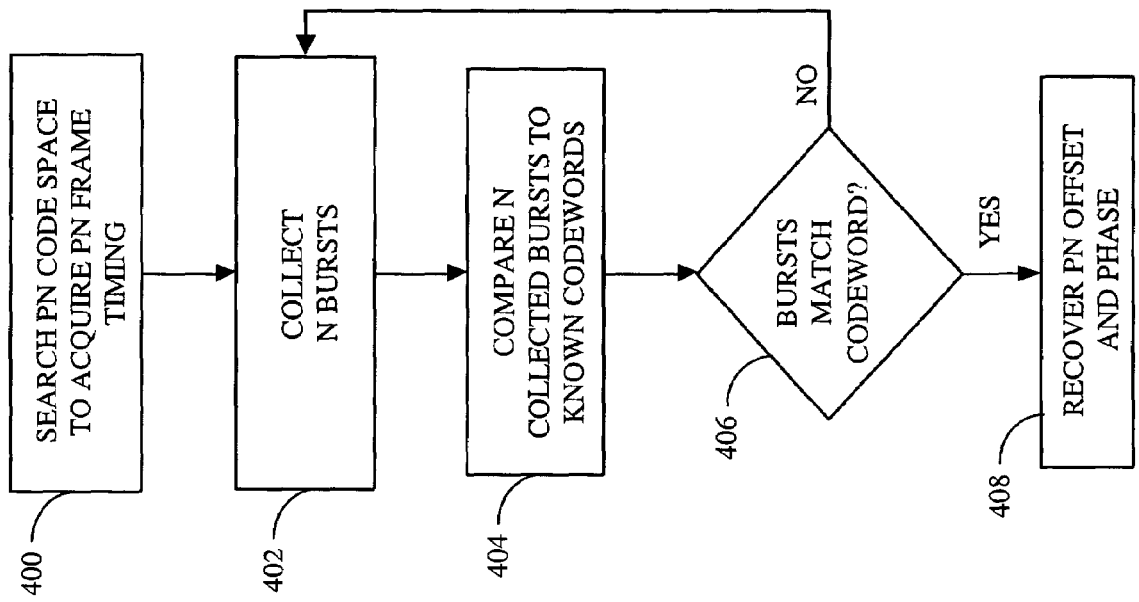
FIG. 4 is a flowchart of a method that a mobile station may use when receiving the channels illustrated in FIG. 3.

In order for the mobile station to acquire the PN offset and superframe phase of the transmitting base station using the technique of FIG. 3, the mobile station may follow the method outlined in FIG. 4. The method of FIG. 4 begins in block 400 with the mobile station executing a search of PN code space to acquire PN frame timing as is well known in the art and described in detail in the above-incorporated patents. Block 400 represents the conventional method of searching through a set of relative PN offsets to find the timing of the PN code transmitted by the base station. Once the mobile station has the relative PN frame timing, it has a reference for collecting the sequence of N bursts (for example, bursts 308A-308D of FIG. 3) at block 402 because the burst timing is aligned with the PN frame timing. In the example of FIG. 3, N=4, and so 4 bursts are collected at block 402.

The N collected bursts are compared against the known codewords in a pattern-matching fashion at block 404. For the example of FIG. 3, the four collected bursts 308A-308D are compared to at least a subset of the 1536 possible codewords used to represent the absolute PN offset (from system time), and the 80 ms PN phase within the sync channel superframe. If the collected bursts match one of the known codewords as determined at decision 406, the mobile station may readily recover the PN offset and phase from, for example, a lookup table that matches known codewords to PN offset/phase combinations. If the collected bursts do not match one of the known codewords, the mobile station may return to step 402 to collect N more bursts and repeat the comparison. The mobile station may combine the energy collected in each respective burst each time it loops through steps 402-406 in order to collect enough energy to make a successful comparison at step 406.

Again, it should be noted that other numerologies other than that shown in FIG. 3 are possible. For example, one may vary the number of search codes used, the number of bursts used to create the pattern, the slot spacing, etc. to providing varying strengths of error correction coding of the burst patterns. For example, although there are 164 possible orthogonal codes in the example of FIG. 3, only 1536 of them are used to represent the PN offset and phase. The number of codes actually used as compared to the number possible provides a rough measure of the robustness of the codes, which can be traded off against transmit power and forward link capacity. It should also be noted that although the 164 search code bursts are orthogonal to each other, they may not be orthogonal to the PN spreading code. This is a matter of design choice. For commonality with the W-CDMA structure, it is preferred that they are not orthogonal to the PN spreading code. As will be understood by one of ordinary skill in the art, this non-orthogonality may lead to a search code timing collision as between two or more base stations transmitting these search codes 308-312. Techniques for mitigating these collisions are given in U.S. Pat. No. 6,385,264, entitled "METHOD AND APPARATUS FOR MITIGATING INTERFERENCE BETWEEN BASE STATIONS IN A WIDEBAND CDMA SYSTEM", assigned to the assignee of the present application and incorporated herein by reference.

Figure 5:
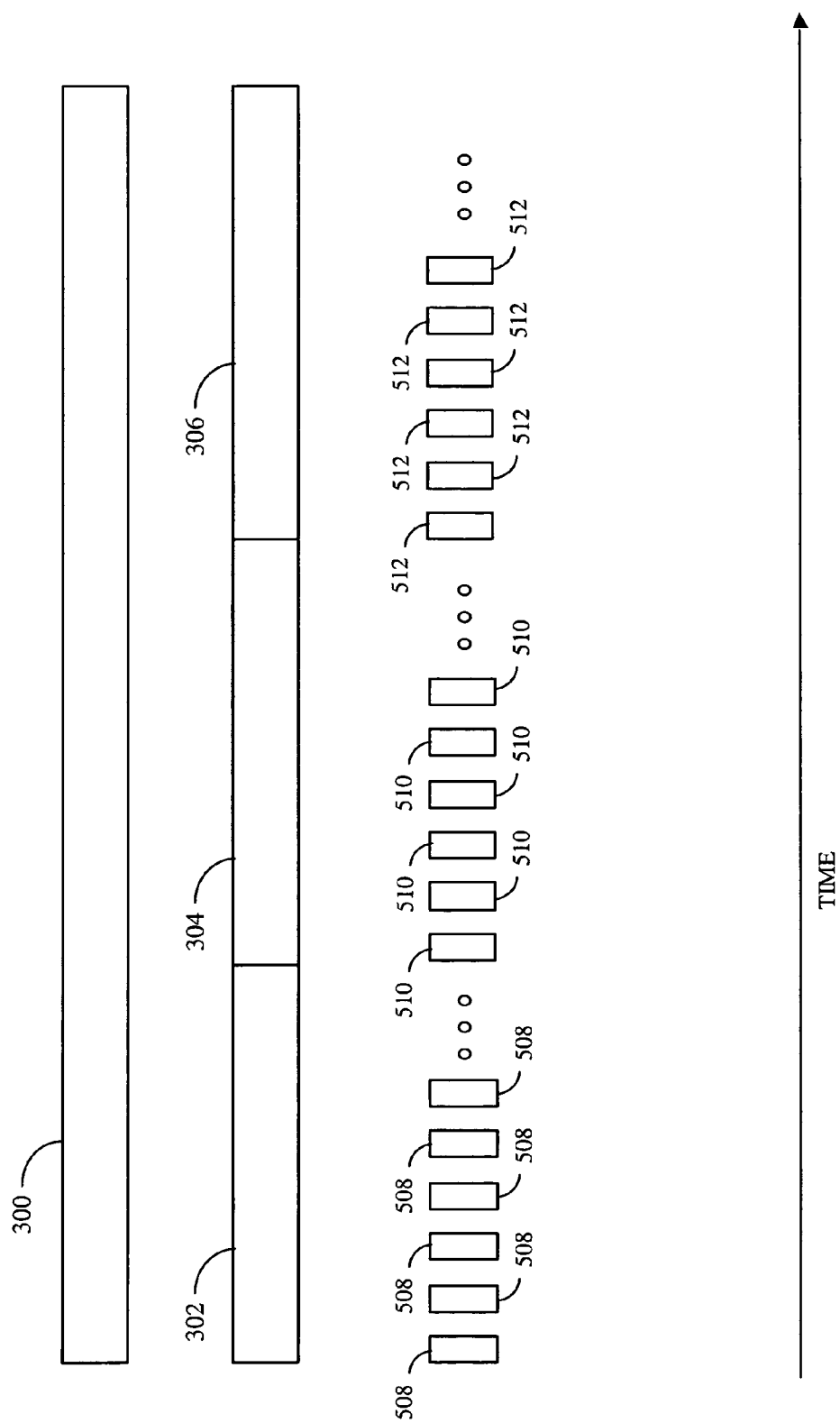
FIG. 5 is a timing diagram of a second embodiment of the present invention.

Turning now to FIG. 5, a timing diagram of a second embodiment of the present invention is illustrated. In FIG. 5, similar to that of FIG. 3, an 80 ms sync channel superframe 300, three 26.67 ms pilot channel frames 302, 304, 306, and a sequence 508-512 of search code bursts are illustrated. However, the search code channel of FIG. 5 differs from that of FIG. 3 in a number of ways. In FIG. 5, each search code burst 508, 510, 512 is comprised of 16 groups of 16 chips. Each 16-chip group is either a particular fixed chip pattern (e.g., [0100110100111010]) or its complement (e.g., [1011001011000101]). It should be noted that these patterns may be arbitrarily constructed, although it may be preferable to have an equal number of ones and zeros to avoid introducing any transmit power bias. Thus, a total of 216 separate search code patterns are possible. Of these, 1536 are used to represent the PN offset (512 possible) and 80 ms phase (3 possible). A single burst is repeated 32 times throughout, and aligned with, each pilot channel frame 302, 304, 306. The same search code is used for all bursts within any given pilot channel frame 302, 304, or 306. Again, it should be noted that other numerologies are possible. A mobile station practicing the embodiment of FIG. 5 may also conform to the method of FIG. 4 where N=1. Also, like the embodiment of FIG. 3, the search codes 508-512 may be non-orthogonal to the remainder of the forward link channels, including the sync channel and the pilot channel as discussed above.

Figure 6:
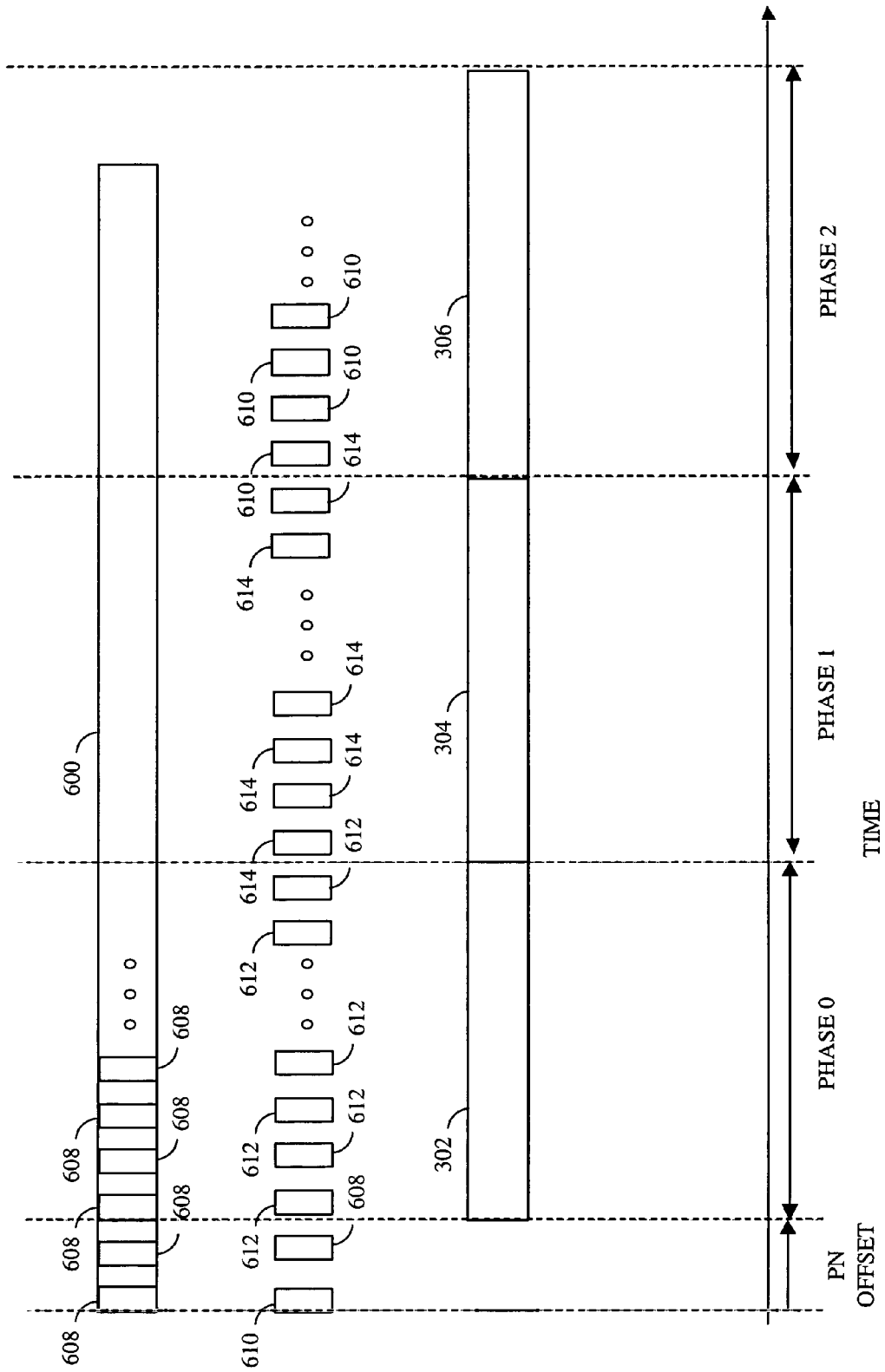
FIG. 6 is a timing diagram of a third embodiment of the present invention.

A timing diagram of a third embodiment of the present invention is illustrated in FIG. 6. In FIG. 6, a sequence of primary search code bursts 608 and a sequence of secondary search code bursts 610A-614B are illustrated, along with three consecutive pilot channel PN frames 302-306. The sequence of primary search code bursts 608 are common to all base stations transmitting the primary search code bursts 608. Each primary search code burst 608 is identical and repeated every X microseconds, where X in the exemplary embodiment of FIG. 6 is 625 microseconds. The primary search code bursts 608 are aligned with the beginning of an 80 ms system time frame 600. In other words, the first primary search code burst 608 occurs at the beginning of each 80 ms system time frame 600, and is repeated throughout the frame 600.

A repeating sequence of secondary search codes 610A-614B is transmitted separately from the primary search codes 608. The secondary search codes 610A-614B are a repeating sequence of two-burst codes used to encode the PN offset and 80 ms PN timing phase. There are 16 codes over two bursts. Of course, numerologies are within the scope of the present invention. The PN offset is the difference between the beginning of an 80 ms system time frame 600 and the beginning of the phase 0 frame 302 of the pilot channel. In the embodiment of FIG. 6, the PN offset may be at N increments of 192 chips, where N may range from 0 to 511.

As can be seen from FIG. 6, the secondary search code sequence 612A, 612B begins at the beginning of, and aligned with, phase 0 pilot channel frame 302. The secondary search code sequence 612A, 612B is repeated throughout the phase 0 pilot channel frame 302. A new secondary search code sequence 614A, 614B begins at the beginning of, and aligned with, phase 1 pilot channel frame 304. The secondary search code sequence 614A, 614B is repeated throughout the phase 1 pilot channel frame 304. A new secondary search code sequence 610A, 610B begins at the beginning of, and aligned with, phase 2 pilot channel frame 306. The secondary search code sequence 610A, 610B is repeated throughout the phase 1 pilot channel frame 306.

Figure 7:
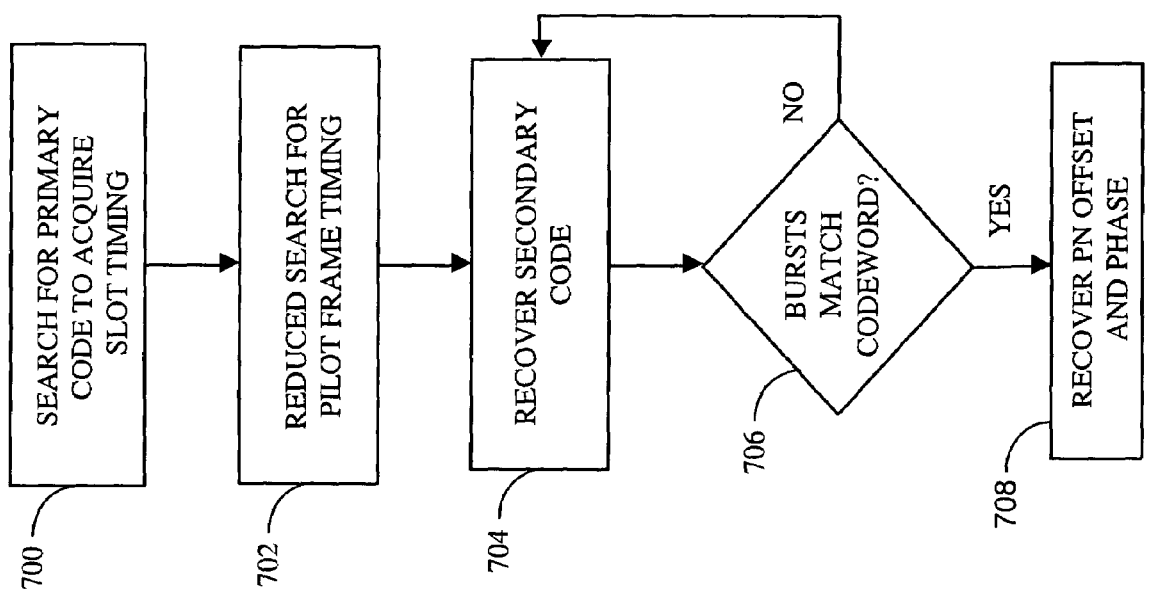
FIG. 7 is a flowchart of a method that a mobile station may use when receiving the channels illustrated in FIG. 6.

A mobile station may use the method of FIG. 7 to acquire the PN offset and phase from the channels shown in FIG. 6. In FIG. 7, the method begins at step 700 where the mobile station searches for the primary code bursts 608 in order to acquire slot-resolution timing. In the example of FIG. 6, that slot resolution is in 625 microsecond increments. Thus, at this time, the mobile station would know that system time is an integer multiple of 625 microseconds from the point beginning of a primary search code burst 608. In step 702, the mobile station performs a "reduced" search for pilot frame timing to acquire the pilot channel frames 302, 304, 306. This search is "reduced" over a conventional brute-force search over all possible PN shifts because the mobile station already knows that the system time is aligned with an integer multiple of 625 microseconds from the beginning of a primary search code burst 608. Thus, the mobile station need only search through a limited number of PN shifts to find pilot PN frame timing. Thus, in the example of FIG. 6, the mobile station does not have to perform an exhaustive search over all possible PN chip shifts, but rather may limit its search by increments of many chips. Additionally, a conventional neighbor list may further limit the search space.

At step 704, the mobile station recovers the secondary search code bursts, for example, 612 of FIG. 6. Because the mobile station knows that the primary search code timing and the secondary search code timing are aligned, it can determine the difference between the pilot PN frame timing and the secondary search code slot timing. Due to the number of possible offsets between the search code bursts and the PN frame timing, the mobile station can resolve 12-way ambiguity of the 1536 (512 PN offsets and 3 phases) possibilities. The mobile station compares the recovered secondary code bursts to a predetermined codeword list to resolve the remaining 128-way ambiguity, and therefore decode and recover the PN offset and phase at step 708. As in the previous embodiments, if sufficient energy is not collected in one repetition of the secondary search code bursts, the mobile station may wait to collect additional secondary search code bursts as indicated by the loop between steps 704 and 706 in FIG. 7.

An example way to encode the 128-way ambiguity is to encode the time offset between the beginning of the 80 ms system time super frame 600 and the beginning of each PN frame 302, 304, 306. Thus, secondary search codes 612 would be encoding the quantity "PN offset." The secondary search codes 614 would be encoding the quantity "PN offset+ PN sequence length (chips)", and secondary search codes 610 would be encoding "PN offset+2*(PN sequence length (chips))". Basically, if one takes any secondary search code and decodes its value, that value indicates how many chips there are between the beginning of the 80 ms system super frame and the nearest PN frame boundary to the left (as shown in FIG. 6) of the decoded secondary search code. Exemplary possible values for this offset is 192*n, where n goes from 0 to 1535, over the three phases. Note the offset modulo 2304 is already known (this is just the time offset between the PN frame boundary you are looking at and the previous search code). That is: offset (=192*n)=X (known)+2304*m where m goes from 0 to 127. So by encoding the value of m in the secondary search code, one can determine the timing offset (relative to the 80 ms system time super frame).

It should be noted, again, that the above example is based on a given numerology that divides the system time into a convenient integer number of search code burst slots. Other numerologies are well within the scope of the present invention. Additionally, it should be noted that some error-correction coding can be used for the secondary search code in the manner that was described above with reference to the earlier-presented embodiments. Additionally, in alternate embodiments, the primary and secondary search codes could be orthogonal to the rest of the channels.

Figure 8:
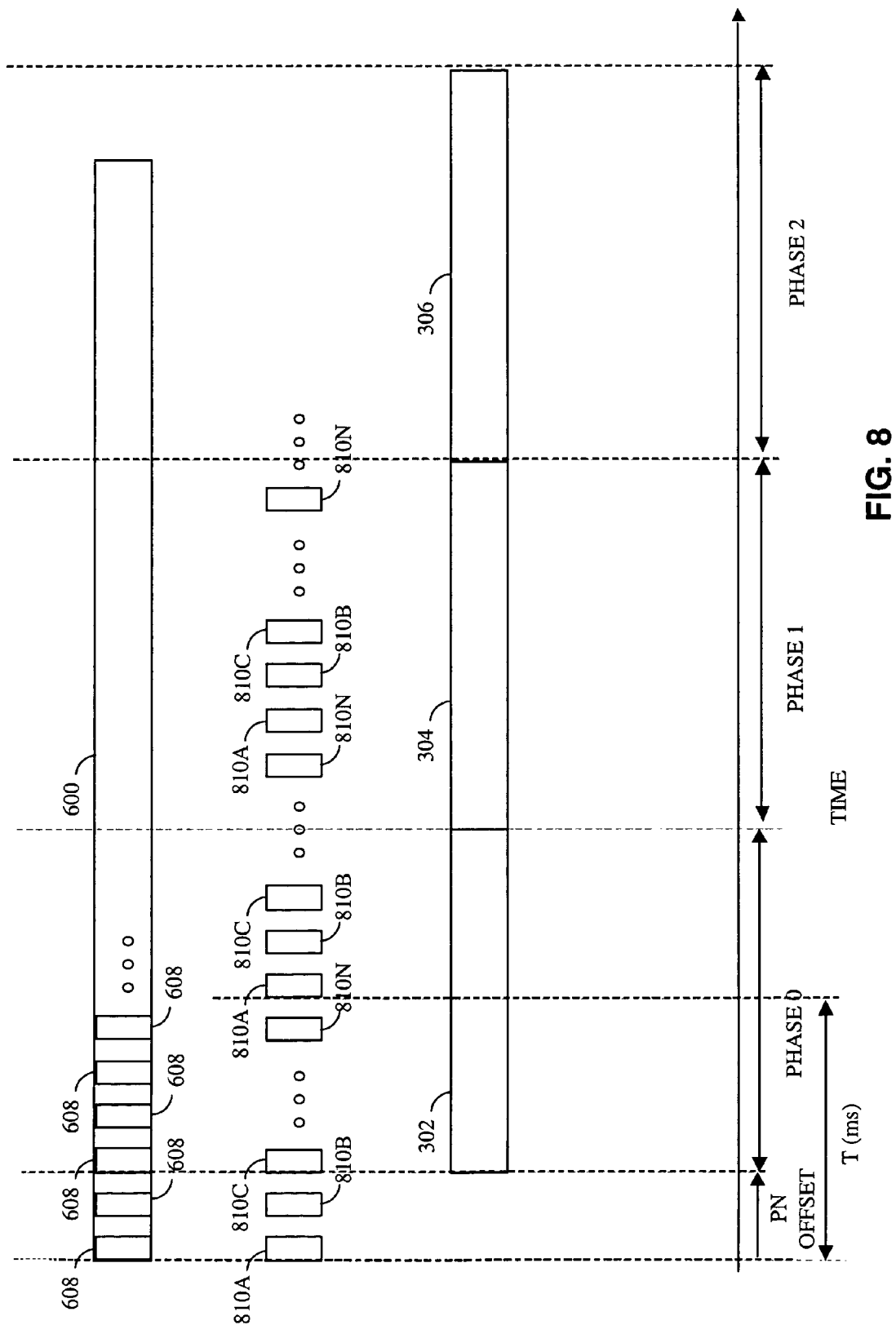
FIG. 8 is a timing diagram of a fourth embodiment of the present invention.

A timing diagram of a fourth embodiment of the present invention is illustrated in FIG. 8. Similar to FIG. 6, a sequence of primary search code bursts 608 and a sequence of secondary search code bursts 810A-810N are illustrated, along with three consecutive pilot channel PN frames 302-306. The sequence of primary search code bursts 608 are common to all base stations transmitting the primary search code bursts 608. Each primary search code burst 608 is identical and repeated every X microseconds, where X in the exemplary embodiment of FIG. 8 is 625 microseconds. The primary search code bursts 608 are aligned with the beginning of an 80 ms system time frame 600. In other words, the first primary search code burst 608 occurs at the beginning of each 80 ms system time frame 600, and is repeated throughout the frame 600.

A repeating sequence of secondary search codes 810A-810N is transmitted separately from the primary search codes 608. The secondary search codes 810A-810N are a repeating sequence of N-burst codes used to encode the PN offset and 80 ms PN timing phase. In the exemplary embodiment of FIG. 8, these N bursts represent one of 16 comma-free codes. Of course, numerologies are within the scope of the present invention. Again, the PN offset is the difference between the beginning of an 80 ms system time frame 600 and the beginning of the phase 0 frame 302 of the pilot channel. In the embodiment of FIG. 8, the PN offset may be at M increments of 192 chips, where M may range from 0 to 511.

As can be seen from FIG. 8, the secondary search code sequence 810A-810N begins at the beginning of, and aligned with, system time frame 600, and repeats every T milliseconds (ms). In the exemplary embodiment of FIG. 8, T is 10 ms. Thus, the secondary search code bursts 810A-810N are repeated eight times during, and aligned with, each system time frame 600. As stated above, the secondary search code bursts 810A-810N may be one of 16 codes. Each of these codes is used to represent a "group" or subset of possible PN offsets. Since there are 512 separate possible PN offsets, each one of the 16 codes may be used to represent one of 32 groups of PN offsets to which the transmitting base station belongs.

Figure 9:
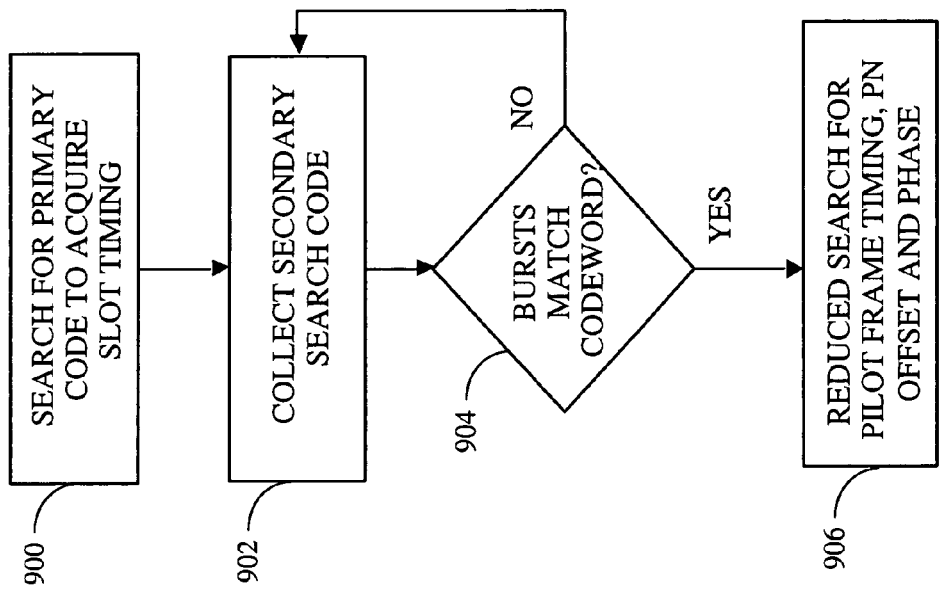
FIG. 9 is a flowchart of a method that a mobile station may use when receiving the channels illustrated in FIG. 8.

A mobile station may use the method illustrated in FIG. 9 to determine the PN offset and phase when receiving the signals shown in FIG. 8. In FIG. 9, the method begins at block 900 with the mobile station searching for the primary search code 608 in order to acquire slot timing. Once the slot timing is known, the mobile station can begin to collect the N-burst secondary search code 810A-810N at block 902. If, after collecting N bursts, the mobile station is unable to pattern match the collected secondary search codes 810A-810N with a known codeword as determined at decision 904, the mobile station may return to block 902 to collect more energy from the secondary search codes 810A-810N in subsequent bursts, using a cyclic shift. Otherwise, if the secondary search code burst 810A-810N pattern matches a known codeword, then the flow proceeds to block 906.

At block 906, a reduced search for pilot frame timing, PN offset and phase is performed. Due to the nature of the timing and encoding of the signals illustrated in FIG. 8, once the mobile station has acquired the timing of the secondary search codes 810A-810N, it has information about system time. For example, in the exemplary embodiment of FIG. 8 where the system time frame is 80 ms, and the secondary search code bursts 810A-810N repeat every 10 ms during, and aligned with, the system time frame, the mobile station then knows system time within a 10 ms resolution. In other words, the mobile station knows that a system time frame begins in Y multiples of 10 ms from the present, where Y may range from 0 to 7 (eight-way ambiguity). Furthermore, once the mobile station has decoded the secondary search code bursts 810A-810N by pattern matching against known codewords at decision 904, it has information about which PN offset group the transmitting base station belongs to. Thus, in the above example where there are 16 groups of 32 offsets represented by the secondary search code bursts 810A-810N, the mobile station knows that the transmitting base station has one of 32 different offsets. As a result, at block 906, the mobile station may use this information to reduce the code space through which it must perform PN correlation in order to acquire the pilot channel frame timing, PN offset, and phase. In the example just given, there would be an 8-way system time frame alignment ambiguity, and a 32-way PN offset ambiguity to resolve, meaning that the mobile station need only try a maximum of 8*32=256 possible PN shifts in order to determine the PN offset and phase.

Again, it should be noted that the above numerologies are used only as examples, and that a person of ordinary skill in the art could use the teachings of the present invention to design systems having different numerologies without departing from the present invention. For example, in the embodiment discussed in FIG. 8 and FIG. 9, the use of more secondary search codes 810A-810N could be used to further limit the scope of the search required in block 906 by reducing the number of ambiguities to be resolved.

Figure 10:
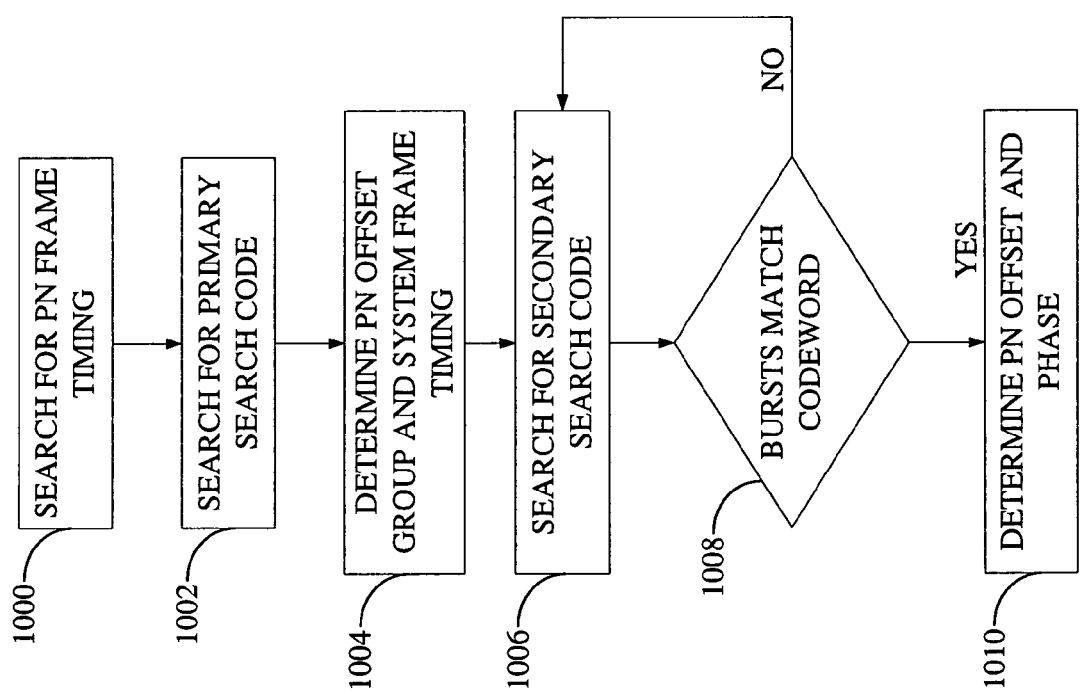
FIG. 10 is a flowchart of an alternate method that a mobile station may use when receiving the channels illustrated in FIG. 8 when such channels have been orthogonalized and spread.

FIG. 10 illustrates an alternate embodiment of a search procedure that may be used by a mobile station receiving the channels depicted in FIG. 8, if these channels (primary search code 608, secondary search code 810A-810N) are covered with different orthogonal Walsh sequences, and thereafter spread by the same PN sequence used to spread the pilot channel frames 302-306. In such a case, the mobile station would first search for and acquire the PN frame 1000 timing by using a conventional PN correlation search as described in the above referenced patents. Once the PN correlation was complete, the mobile station could then despread, uncover and acquire the primary search code 608 at block 1002. Once the primary search code 608 was acquired, the mobile station may determine the PN offset group and system frame timing by comparing the pilot channel frame 302-306 timing to the primary search code 608 timing at block 1004. The mobile station searches for the secondary search code 810A-810N at block 1006, and if it finds a codeword pattern match as determined at decision 1008, the mobile station uses the secondary search code 810A-810N to resolve the remaining ambiguities and thus determine the absolute PN offset and phase. It should be noted that in the embodiment just described with reference to FIG. 8 and FIG. 10, a different Walsh code is needed for each search code.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus in a wireless communication system, comprising:
   means for correlating a PN sequence with a received pilot signal to acquire a PN frame timing;
   means for receiving at least one search code burst aligned with said PN frame timing, said at least one search code burst signifying a pilot channel PN offset; and
   means for comparing said at least one search code burst to a set of codewords, each codeword representing a predetermined PN offset.

2. The apparatus of claim 1, wherein said at least one search code burst comprises a plurality of search code bursts repeated a predetermined number of times per PN frame, and wherein said plurality of search code bursts signify said pilot channel PN offset and phase.

3. The apparatus of claim 1, wherein said at least one search code burst comprises a single search code burst repeated a predetermined number of times per PN frame, and wherein said single search code burst signifies said pilot channel PN offset and phase.

4. The apparatus of claim 3, wherein each of said single search code bursts is comprised of a predetermined number of fixed chip patterns or their complement.

5. The apparatus of claim 2, wherein said plurality of search code bursts are non-orthogonal to other received channels.

6. An apparatus in a wireless communication system, comprising:
   means for searching for a primary search code to acquire a search code slot timing, said primary search code aligned with a system time frame;
   means for correlating a PN sequence with a received pilot signal to acquire a PN frame timing using said search code slot timing;
   means for searching for at least one secondary search code burst aligned with said PN frame timing, said at least one secondary search code burst signifying said pilot channel PN offset; and
   means for comparing said at least one secondary search code burst to a set of codewords, each codeword representing a predetermined PN offset.

7. The apparatus of claim 6, wherein said secondary search code comprises a plurality of search code bursts repeated a predetermined number of times per PN frame, said plurality of search code bursts encoding said pilot channel PN offset and phase.

8. An apparatus in a wireless communication system, comprising:
   means for searching for a primary search code to acquire a search code slot timing, said primary search code aligned with a system time frame;
   means for searching for at least one secondary search code burst aligned with said search code slot timing;
   means for comparing said at least one secondary search code burst to a set of codewords, each codeword representing a predetermined PN offset group; and
   means for correlating a PN sequence with a received pilot signal at a plurality of PN offsets associated with said PN offset group to find said pilot channel PN offset and phase.

9. The apparatus of claim 8, wherein said at least one secondary search code burst comprises a plurality of search code bursts repeated a predetermined number per system time frame.

10. The apparatus of claim 9, wherein said correlating step further comprises correlating said PN sequence at a plurality of PN shifts associated with said predetermined number of repeated search code bursts.

11. An apparatus in a wireless communication system, comprising:
    means for correlating a PN sequence with a received pilot signal to acquire a PN frame timing;
    means for searching for a primary search code using said PN frame timing to acquire a search code slot timing, said primary search code aligned with a system time frame;
    means for determining a PN offset group and system frame timing from a difference between said PN frame timing and said search code slot timing;
    means for searching for at least one secondary search code burst aligned with said search code slot timing; and
    means for comparing said at least one secondary search code burst to a set of codewords, each codeword representing a predetermined pilot channel PN offset and phase.

12. The apparatus of claim 11, wherein said pilot signal, primary search code, and at least one secondary search code burst are each spread using the same PN sequence.

13. The apparatus of claim 12 wherein said pilot signal, primary search code, and at least one secondary search code burst are each covered with a different orthogonal Walsh sequence.

14. An apparatus in a wireless communication system, comprising:
    means for transmitting a pilot channel having a repeating sequence of PN frames; and
    means for transmitting at least one search code channel, said at least one search code channel comprising a repeating sequence of bursts, said at least one search code channel for providing a pilot channel PN offset of said pilot channel.

15. The apparatus of claim 14 wherein said at least one search code channel comprises a plurality of search code bursts repeated a predetermined number of times per PN frame, and wherein said plurality of search code bursts signify said pilot channel PN offset and phase.

16. The apparatus of claim 14 wherein said at least one search code channel comprises a single search code burst repeated a predetermined number of times per PN frame, and wherein said single search code burst signifies said pilot channel PN offset and phase.

17. The apparatus of claim 16 wherein each of said single search code bursts is comprised of a predetermined number of fixed chip patterns or their complement.

18. The apparatus of claim 15 wherein said plurality of search code bursts are non-orthogonal to other transmitted channels.

19. The apparatus of claim 14 wherein said at least one search code channel comprises a primary search code channel and a secondary search code channel.

20. The apparatus of claim 19 wherein said secondary search code channel comprises a plurality of search code bursts repeated a predetermined number of times per PN frame, said plurality of search code bursts encoding said pilot channel PN offset and phase.

21. The apparatus of claim 19 wherein said secondary search code channel comprises a plurality of search code bursts repeated a predetermined number of times per system time frame.

22. The apparatus of claim 19 wherein said pilot channel, primary search code channel, and secondary search code channel are each spread using the same PN sequence.

23. The apparatus of claim 22 wherein said pilot channel, primary search code channel, and secondary search code channel are each covered with a different orthogonal Walsh sequence.

24. A wireless communication system, comprising:
a base station; and
a mobile station in wireless communication with the base station, the mobile station configured to correlate a PN sequence with a received pilot signal to acquire a PN frame timing, receive at least one search code burst aligned with said PN frame timing, said at least one search code burst signifying a pilot channel PN offset, and compare said at least one search code burst to a set of codewords, each codeword representing a predetermined PN offset.

25. The wireless communication system of claim 24, wherein said at least one search code burst comprises a plurality of search code bursts repeated a predetermined number of times per PN frame, and wherein said plurality of search code bursts signify said pilot channel PN offset and phase.

26. The wireless communication system of claim 24, wherein said at least one search code burst comprises a single search code burst repeated a predetermined number of times per PN frame, and wherein said single search code burst signifies said pilot channel PN offset and phase.

27. The wireless communication system of claim 26, wherein each of said single search code bursts is comprised of a predetermined number of fixed chip patterns or their complement.

28. The wireless communication system of claim 25, wherein said plurality of search code bursts are non-orthogonal to other received channels.

29. A wireless communication system, comprising:
a base station; and
a mobile station in communication with the base station, the mobile station configured to search for a primary search code to acquire a search code slot timing, said primary search code aligned with a system time frame, correlate a PN sequence with a received pilot signal to acquire a PN frame timing using said search code slot timing, search for at least one secondary search code burst aligned with said PN frame timing, said at least one secondary search code burst signifying said pilot channel PN offset, and compare said at least one secondary search code burst to a set of codewords, each codeword representing a predetermined PN offset.

30. The wireless communication system of claim 29, wherein said secondary search code comprises a plurality of search code bursts repeated a predetermined number of times per PN frame, said plurality of search code bursts encoding said pilot channel PN offset and phase.

31. A wireless communication system, comprising:
a base station; and
a mobile station in communication with the base station, said mobile station configured to search for a primary search code to acquire a search code slot timing, said primary search code aligned with a system time frame, search for at least one secondary search code burst aligned with said search code slot timing, compare said at least one secondary search code burst to a set of codewords, each codeword representing a predetermined PN offset group, and correlate a PN sequence with a received pilot signal at a plurality of PN offsets associated with said PN offset group to find said pilot channel PN offset and phase.

32. The wireless communication system of claim 31, wherein said at least one secondary search code burst comprises a plurality of search code bursts repeated a predetermined number of times per system time frame.

33. The wireless communication system of claim 31, wherein said correlating step further comprises correlating said PN sequence at a plurality of PN shifts associated with said predetermined number of repeated search code bursts.

34. A wireless communication system, comprising:
a base station; and
a mobile station in wireless communication with the base station, said mobile station configured to correlate a PN sequence with a received pilot signal to acquire a PN frame timing, search for a primary search code using said PN frame timing to acquire a search code slot timing, said primary search code aligned with a system time frame, determine a PN offset group and system frame timing from a difference between said PN frame timing and said search code slot timing, search for at least one secondary search code burst aligned with said search code slot timing, and compare said at least one secondary search code burst to a set of codewords, each codeword representing a predetermined pilot channel PN offset and phase.

35. The wireless communication system of claim 34, wherein said pilot signal, primary search code, and at least one secondary search code burst are each spread using the same PN sequence.

36. The wireless communication system of claim 35 wherein said pilot signal, primary search code, and at least one secondary search code burst are each covered with a different orthogonal Walsh sequence.

37. A wireless communication system, comprising:
a base station, and a mobile station in communication with said base station, said mobile station configured to transmit a pilot channel having a repeating sequence of PN frames, and transmit at least one search code channel, said at least one search code channel comprising a repeating sequence of bursts, said at least one search code channel for providing a pilot channel PN offset of said pilot channel,
wherein said at least one search code channel comprises a single search code burst repeated a predetermined number of times per PN frame, wherein said single search code burst signifies said pilot channel PN offset and phase, and
wherein each of said single search code bursts is comprised of a predetermined number of fixed chip patterns or their complement.

38. A wireless communication system, comprising:
a base station, and a mobile station in communication with said base station, said mobile station configured to transmit a pilot channel having a repeating sequence of PN frames, and transmit at least one search code channel, said at least one search code channel comprising a repeating sequence of bursts, said at least one search code channel for providing a pilot channel PN offset of said pilot channel,
wherein said at least one search code channel comprises a primary search code channel and a secondary search code channel.

39. The wireless communication system of claim 38 wherein said secondary search code channel comprises a plurality of search code bursts repeated a predetermined number of times per PN frame, said plurality of search code bursts encoding said pilot channel PN offset and phase.

40. The wireless communication system of claim 38 wherein said secondary search code channel comprises a plurality of search code bursts repeated a predetermined number of times per system time frame.

41. The wireless communication system of claim 38 wherein said pilot channel, primary search code channel, and secondary search code channel are each spread using the same PN sequence.

42. The wireless communication system of claim 41 wherein said pilot channel, primary search code channel, and secondary search code channel are each covered with a different orthogonal Walsh sequence.

* * * * *